(12) United States Patent
Jemiolo

(10) Patent No.: US 9,753,703 B2
(45) Date of Patent: Sep. 5, 2017

(54) GENERATING IDENTIFIERS FOR USER INTERFACE ELEMENTS OF A WEB PAGE OF A WEB APPLICATION

(71) Applicant: salesforce.com, inc., San Francisco, CA (US)

(72) Inventor: Daniel Everett Jemiolo, Cary, NC (US)

(73) Assignee: salesforce.com, inc., San Francisco, CA (US)

(*) Notice: Subject to any disclaimer, the term of this patent is extended or adjusted under 35 U.S.C. 154(b) by 110 days.

(21) Appl. No.: 14/606,855

(22) Filed: Jan. 27, 2015

(65) Prior Publication Data

US 2015/0220312 A1   Aug. 6, 2015

Related U.S. Application Data

(60) Provisional application No. 61/935,646, filed on Feb. 4, 2014.

(51) Int. Cl.
| | |
|---|---|
| *G06F 17/00* | (2006.01) |
| *G06F 9/44* | (2006.01) |
| *G09B 5/00* | (2006.01) |
| *G09B 9/00* | (2006.01) |
| *G09B 19/00* | (2006.01) |
| *H04L 29/08* | (2006.01) |

(Continued)

(52) U.S. Cl.
CPC .............. *G06F 8/38* (2013.01); *G06F 3/048* (2013.01); *G06F 17/3089* (2013.01); *G09B 5/00* (2013.01); *G09B 9/00* (2013.01); *G09B 19/0053* (2013.01); *H04L 67/10* (2013.01); *H04L 67/02* (2013.01)

(58) Field of Classification Search
CPC ....... G06F 17/22; G06F 17/2247; G06F 17/24
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |

(Continued)

OTHER PUBLICATIONS

U.S. Appl. No. 14/546,965, filed Nov. 18, 2014, Jemiolo.

(Continued)

*Primary Examiner* — Keith Bloomquist
(74) *Attorney, Agent, or Firm* — Weaver Austin Villeneuve & Sampson LLP

(57) ABSTRACT

Disclosed are database systems, methods, and computer program products for generating identifiers for user interface elements of a web page of a web application. In some implementations, a server of a database system analyzes a copy of source code for a first web page. The first web page may comprise user interface elements capable of being generated from the source code. The server identifies one or more of the user interface elements of the first web page as not having a unique identifier or as having a dynamically generated identifier. The server generates, for each identified user interface element, a further unique identifier to be associated with the respective identified user interface element. The server generates edited source code comprising one or more further unique identifiers for the identified one or more user interface elements. The server stores the edited source code in a database of the database system.

20 Claims, 10 Drawing Sheets

(51) Int. Cl.
*G06F 3/048* (2013.01)
*G06F 17/30* (2006.01)

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,829,746 B1 * | 12/2004 | Schwerdtfeger .... G06F 17/2247 704/271 |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,392,243 B2 * | 6/2008 | Brown ............... G06F 17/2211 |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,330,191 B2 * | 5/2016 | Teevan ............... G06F 17/3089 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |

(56) References Cited

U.S. PATENT DOCUMENTS

| | | |
|---|---|---|
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0091510 A1* | 4/2005 | McKeon ............... G06F 9/4443 713/185 |
| 2005/0125716 A1* | 6/2005 | Cragun ................ G06F 17/241 715/222 |
| 2007/0050844 A1* | 3/2007 | Lebel ................ G06F 11/3414 726/13 |
| 2008/0172612 A1* | 7/2008 | Allen .................... G06F 9/4446 715/708 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0228805 A1* | 9/2009 | Ruehle ................. G06F 9/4435 715/745 |
| 2011/0035435 A1* | 2/2011 | Meng ....................... G06F 9/54 709/203 |
| 2011/0107153 A1* | 5/2011 | Shufer ................ G06F 11/3668 714/45 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0136944 A1* | 5/2014 | Harris .................. G06F 17/211 715/234 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0140503 A1 | 5/2016 | Jemiolo |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

GENERATING IDENTIFIERS FOR USER INTERFACE ELEMENTS OF A WEB PAGE OF A WEB APPLICATION

PRIORITY DATA

This patent document claims priority to commonly assigned U.S. Provisional Patent Application No. 61/935,646, titled "Automated Training and Assessment Platform, and System for Emulating Ideal Markup for Integrating Web Applications," by Regan et al., filed on Feb. 4, 2014, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing services in an on-demand services environment using a database system and, more specifically, to techniques for generating identifiers for user interface elements of a web page of a web application.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer program products for generating identifiers for user interface elements of a web page of a web application. These drawings in no way limit any changes in form and detail that may be made by one skilled in the art without departing from the spirit and scope of the disclosed implementations.

DETAILED DESCRIPTION

Figure 1:
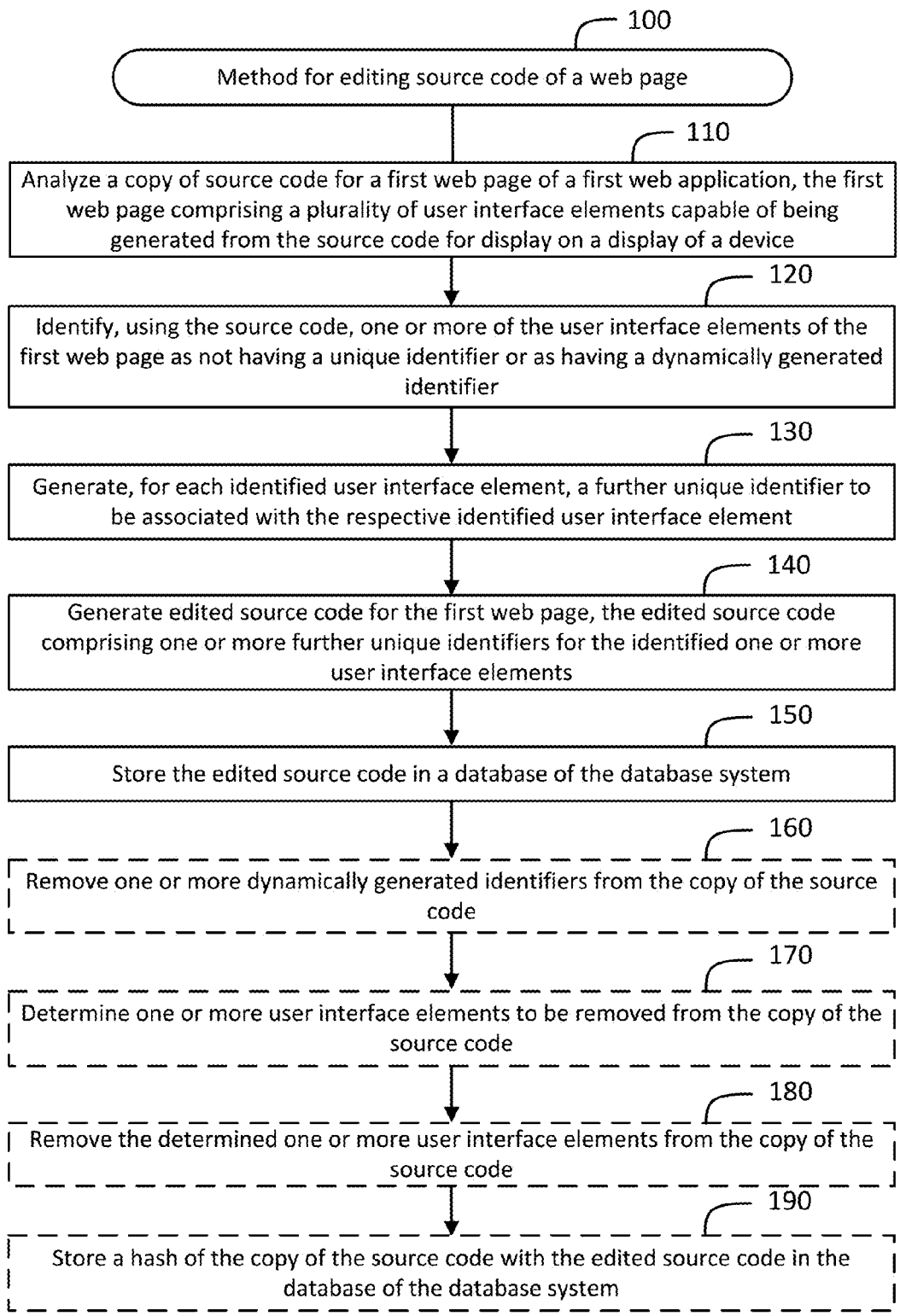
FIG. 1 shows a flowchart of an example of a method 100 for editing source code of a web page, performed in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products relate to generating identifiers for user interface elements of a web page of a web application. In some implementations, a web application may be provided using a server-based database system to interact with another application or service, such as a cloud-based enterprise application. Interacting with the other application or service may involve inspecting the underlying markup, or HyperText Markup Language (HTML) source code, of the web pages of the other application or service in order to determine how an element of the web page, such as a button, a field, etc., can be referred to in future page loads. Because there are different ways to make such a reference, such as using Cascading Style Sheets (CSS) selectors or XPath, and each method of referencing an element of the web page has its own options, it may be a challenge to identify a correct, deterministic way to refer to each relevant element of a web page.

In some implementations, in order to integrate the web application with the other application or service, the source code of the other application or service may be edited and optimized such that the edited source code includes all of the metadata necessary for properly referring to each web page element of the application in future page loads.

For example, a user may use a walkthrough authoring tool to record a demonstration of how to perform a particular task using a cloud-based enterprise application. The demonstration may be recorded as a series of steps of a walkthrough, and the walkthrough may be later displayed to a user using the same cloud-based enterprise application. In order for the walkthrough to correctly play back the recorded series of steps, each user interface element of the enterprise application that the walkthrough interacts with should be uniquely identified in the enterprise application such that future walkthrough playbacks select the correct user interface elements when playing back the series of walkthrough steps.

In the case that some of the elements of the enterprise application do not contain unique identifiers, some of the disclosed implementations may inspect the source code of the enterprise application and identify any relevant user interface elements, generate unique identifiers for the user interface elements, and store an edited copy of the source code containing the newly generated unique identifiers. Some of the disclosed implementations may also identify any elements containing dynamically generated identifiers, which may be different on every page load, and replace them with new identifiers and store the edited copy of the source code containing the new identifiers. The walkthrough may then be recorded using the generated unique identifiers, such that when the walkthrough is later played back, each of the user interface elements of the enterprise application may be properly referenced by the walkthrough player.

As another example, a user of a feed-based web application, like Facebook®, may wish to integrate a photo sharing component from a photo web application, like Flickr®, into the sidebar of the feed-based web application. Flickr® may contain a sidebar photo sharing component that the user wishes to directly integrate into his Facebook® sidebar, with some changes to the look and feel of the component so that it matches the rest of the Facebook® look and feel. Some of the disclosed implementations may allow the Facebook® application to generate edited source code for the photo sharing component, such that the elements of the photo sharing component include unique identifiers for the Facebook® application to use to identify and manipulate the contents of the elements of the photo sharing component. Some of the disclosed implementations make it possible to integrate the Flickr® photo sharing component into the Facebook® application and to augment the photo sharing component by adjusting the contents or styling of various elements of the photo sharing component.

In the same manner, the disclosed implementations may be used to optimize source code and markup for various web applications to facilitate integration with an organization's web application, allowing administrators of the organization's web application to integrate and augment user interfaces that do not meet the organization's criteria for successful integration.

FIG. 1 shows a flowchart of an example of a method 100 for editing source code of a web page, performed in accordance with some implementations. In FIG. 1, at block 110, a server of a database system inspects a copy of source code for a web page of a web application. The web page may include one or more user interface elements generated from the source code for the web page. In some implementations, the source code for the web page may be the HTML source code provided by the developer of the web application. In another implementation, the source code for the web page may be the Document Object Model (DOM) generated by the browser from the HTML code of the web application.

In some implementations, the user interface elements for a web page may include one or more of: a textbox, a drop down menu, a button, a radio button list, an attribute field, or any selectable visual element in the web page. The user interface element may also be any HTML element, such as a heading, a paragraph, a link, a list, a table, an input element, a form, a button, a label, a text area, and the like. The identifier may be a class name or an id for the HTML element.

In some implementations, the source code may be provided to the server of the database system from an application server that hosts the web application. The application server may store a source code file containing the source code in a database accessible to the application server. When the server of the database system receives a request to inspect the source code for the web page of the web application, the server may send a request to the application server for a copy of the source code for the web page.

In FIG. 1, at block 120, the server of the database system identifies one or more user interface elements of the web page either as not having a unique identifier, or as having a dynamically generated identifier.

In some implementations, the source code for the web application may include user interface elements that do not have an associated unique identifier. For example, an HTML div element of the source code may not have an associated id attribute. As such, the server of the database system may be unable to identify or manipulate the HTML div element.

In some implementations, the source code may include user interface elements that contain dynamically generated identifiers that are generated each time the user interface elements are loaded for display. For example, an HTML table element may include table cells that have id values that are dynamically generated, and thus, potentially different each time the table is loaded in the web page, depending on the currently logged in user account or the contents of the table. Consequently, the server of the database system may be unable to reliably identify a particular table cell, because the id attribute for the table cell may be different each time the web application is loaded. As an example, a user may be using the database system to create a walkthrough tutorial for using the web application, and one of the walkthrough steps may involve selecting a particular table cell. If the HTML id of the table cell is dynamically generated, the walkthrough tutorial will not have a consistent way of identifying the particular table cell when playing the walkthrough for a user learning to use the web application, because the id will be different each time the web application is loaded for a walkthrough.

In another example, the database system may be used for test automation of the web application. If an HTML element of the web application is involved in the automated tests and contains a dynamically generated identifier, the automated tests may not be able to consistently identify and select the HTML element for testing.

A set of heuristics or rules may be utilized to determine whether an identifier of a user interface element was dynamically generated. In some implementations, the rules may be based on the format of the identifier. As an example, the rules may designate that an identifier that starts with "yui-" and ends with a string of numbers, such as "yui-184763629" is a dynamically generated identifier.

In FIG. 1, at block 130, for each identified user interface element, the server of the database system generates a new unique identifier for association with the respective identified user interface element. If a user interface element does not contain a unique identifier, a new identifier is generated by the server and is associated with the user interface element, such that the user interface element may be identified by another application using the new unique identifier.

If a user interface element includes a dynamically generated identifier, the dynamically generated identifier may be replaced with a new unique identifier generated by the server, such that the user interface element may be consistently identified by another application using the new unique identifier.

In FIG. 1, at block 140, the server of the database system generates edited source code for the first web page. The edited source code may include the new unique identifiers for the identified user interface elements. In some implementations, the edited source code may be substantially similar to the original copy of source code received in block 110 of FIG. 1. The differences may be that HTML elements of the original copy that did not have a unique identifier will have a unique identifier in the form of the HTML id attribute in the edited source code. Moreover, HTML elements of the original copy that contained dynamically generated identifiers may appear in the edited source code with the dynamically generated identifiers removed and newly generated identifiers in their place. In some implementations, the edited source code for the web application, with the newly generated identifiers, is optimized for another application to identify various user interface elements and to interact with them by selecting them or modifying their content.

In FIG. 1, at block 150, the server of the database system stores the edited source code in a database. The edited source code may be stored to be retrieved at a later time when a second application of the database system receives a request to interact with the web application.

As an example, the second application may be an automated testing application that runs automated tests on the web application by identifying various user interface elements in the web application and submitting inputs to the web application.

As another example, the second application may be a walkthrough authoring tool that may be used to create a guided walkthrough for the web application to instruct users to use the web application.

As another example, the second application may be an application that contains code for integrating a portion of a web page of the web application and for manipulating the content of elements of the portion of the web page of the web application. The edited source code for the portion of the web page to be integrated into the second application may provide unique identifiers for each of the user interface elements, such that the second application may identify and manipulate the content of particular user interface elements. For example, the second application may change some of the images or styling so that the branding of the portion of the web page being integrated into second application matches the branding of the second application.

In some implementations, the server may provide for display, using the edited source code, an edited web page of the first web application. The edited web page may be substantially the same as the first web page, except that the edited web page contains the newly generated unique identifiers associated with user interface elements of the edited web page.

In FIG. 1, at block 160, the server of the database system optionally removes one or more dynamically generated identifiers from the copy of the source code. In some implementations, the dynamically generated identifiers are replaced by the newly generated unique identifiers in the edited source code.

In FIG. 1, at block 170, the server of the database system optionally identifies one or more user interface elements to be removed from the copy of the source code. In some implementations, some user interface elements of the web application are unhelpful or irrelevant to the functionality of the web application. User interface elements containing advertising content are an example. In the case of a walkthrough authoring tool, walkthroughs are generally unconcerned with the advertising content of the web application for which the walkthrough is created. As such, irrelevant content such as advertising content may be removed from the copy of the source code.

In FIG. 1, at block 180, the server of the database system removes the identified user interface elements from the copy of the source code.

In FIG. 1, at block 190, the server of the database system stores a hash of the copy of the source code with the edited source code in the database of the database system. As an example, the copy of the source code at this point may be the same as the source code with dynamically generated identifiers removed and with unhelpful user interface elements, such as elements containing advertising content removed. A hash function may be applied to this copy of the source code and the hash function may be stored in the database along with a copy of the edited source code containing the newly generated unique identifiers. The hashed value of the copy of the source code allows the server of the database system to identify subsequent instances of web pages of the web application generated by the source code. The server may identify these subsequent web pages by using the same hash function on the subsequent web pages and comparing the resulting hash value with the hash value stored in the database.

In the event that the resulting hash value matches the hash value stored in the database, the edited source code stored in the database in association with the hash value may be used to update the source code of the subsequent web page to include the unique identifiers for user interface elements in the edited source code. This allows the server to identify and manipulate the user interface elements of the subsequent web page.

In some implementations, when the source code of the subsequent web page is received by the server, the server may first remove dynamically generated identifiers and irrelevant user interface elements from the source code before performing the hash function on the resulting source code and comparing the hash value to the stored hash values in the database. This may depend on whether the copy of the source code that was originally hashed and stored in the database had first had the dynamically generated identifiers and irrelevant user interface elements removed prior to performing the hash function.

Figure 2:
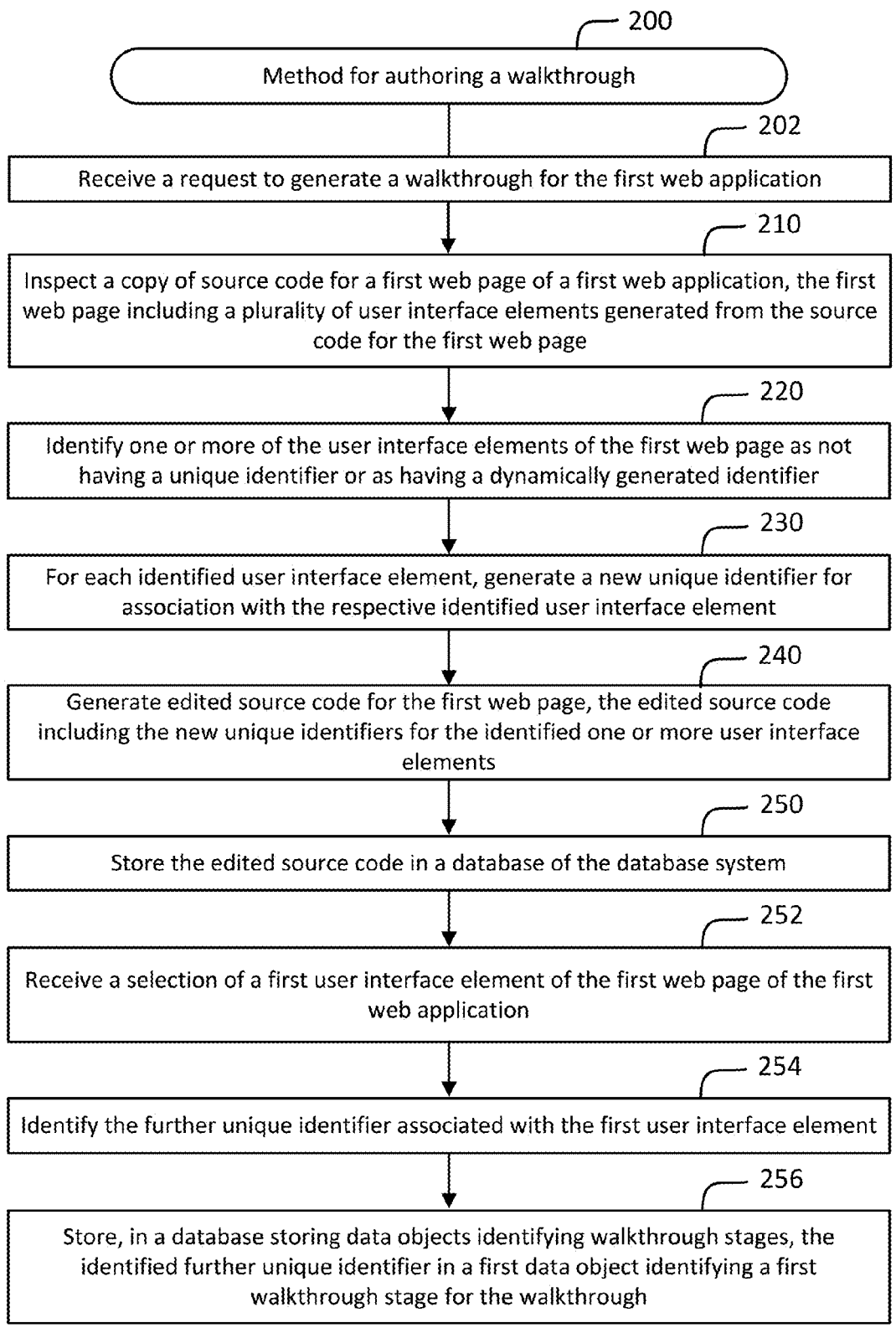
FIG. 2 shows a flowchart of an example of a method 200 for authoring a walkthrough, performed in accordance with some implementations.

FIG. 2 shows a flowchart of an example of a method 200 for authoring a walkthrough, performed in accordance with some implementations. In FIG. 2, at block 202, a server of a database system receives a request to generate a walkthrough for the first web application. In some implementations, the server hosts a walkthrough authoring tool for a web application. A walkthrough may generally refer to an automated presentation for training a user to use an application or service such as a cloud-based enterprise application.

For example, a walkthrough may allow a user to view a series of steps within a web application for performing a particular task. The walkthrough may be interactive in that the user being trained may be able to pause at each step and read notes associated with each step prior to moving on to the next step of the walkthrough. In some cases, a walkthrough may cross between web pages of a web application, save state, respond to user actions, and catch errors. A walkthrough may run on top of a cloud-based application, pointing out pieces of the application to users and instructing them through activities in the application.

A walkthrough authoring tool allows an administrator or other user to generate the walkthrough by performing the series of steps within the web application and recording the series of steps as a walkthrough. The walkthrough authoring tool may also allow the user to add notes and additional information for each step of the walkthrough. The walkthrough authoring tool may record and store references to the various user interface elements of the web application that are selected or interacted with during the course of the walkthrough. As such, it is advantageous for each of the user interface elements of the web application to have a unique identifier that may be stored by the walkthrough authoring tool, so that the walkthrough may be able to identify those same user interface elements when the walkthrough is played for a user being trained to perform the particular task.

Figure 4:
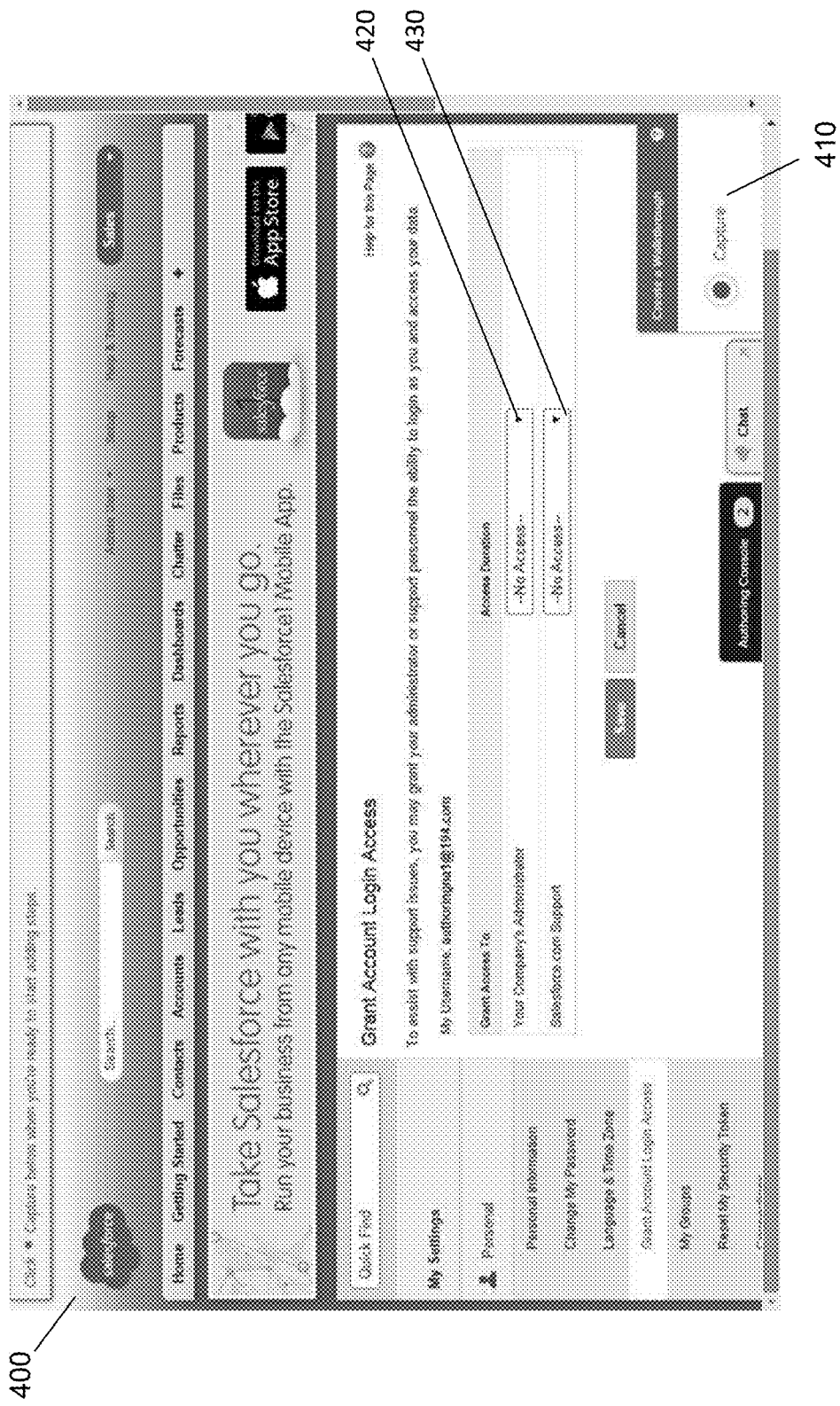
FIG. 4 shows an example of a user interface 400 for creating a walkthrough for an application, in accordance with some implementations.

FIG. 4 shows an example of a user interface 400 for creating a walkthrough for an application, in accordance with some implementations. In FIG. 4, the walkthrough authoring tool allows a user to record a series of steps for granting account login access for the user's personal salesforce.com® account to the user's company's administrator and/or the salesforce.com® support team. The walkthrough authoring tool may begin to record steps performed by the user after the user selects the "Capture" selection 410 in the user interface 400.

In some implementations, various user interface elements of the user interface 400, such as dropdown menus 420 and 430, may or may not contain associated unique identifiers. The server may perform blocks 210, 220, 230, 240, and 250 of FIG. 2, described hereafter, to generate edited source code for the web application that contains unique identifiers for all of the relevant user interface elements that may be selected by the user using the walkthrough authoring tool.

In FIG. 2, at block 210, the server of the database system inspects a copy of source code for a web page of a web application, as generally described in block 110 of FIG. 1.

In FIG. 2, at block 220, the server of the database system identifies one or more user interface elements of the web page either as not having a unique identifier, or as having a dynamically generated identifier, as generally described in block 120 of FIG. 1.

In FIG. 2, at block 230, the server of the database system for each identified user interface element, the server of the database system generates a new unique identifier for association with the respective identified user interface element, as generally described in block 130 of FIG. 1.

In FIG. 2, at block 240, the server of the database system the server of the database system generates edited source code for the first web page, as generally described in block 140 of FIG. 1.

In FIG. 2, at block 250, the server of the database system the server of the database system stores the edited source code in a database, as generally described in block 150 of FIG. 1.

In some implementations, blocks 210-250 of FIG. 2 may be performed when the walkthrough authoring tool is initially loaded and the web application is displayed. In other implementations, blocks 210-250 of FIG. 2 may be performed after the user selects the Capture selection 410 of FIG. 4 and initiates recording of the walkthrough. At that point, the server may generate the edited source code containing the unique identifiers for the user interface elements and update the display of the application to include the unique identifiers.

In FIG. 2, at block 252, the server of the database system receives a selection of a user interface element of the web application displayed in the walkthrough authoring tool. The selected user interface element may be associated with a unique identifier generated by the server at block 230 of FIG. 2.

Figure 5:
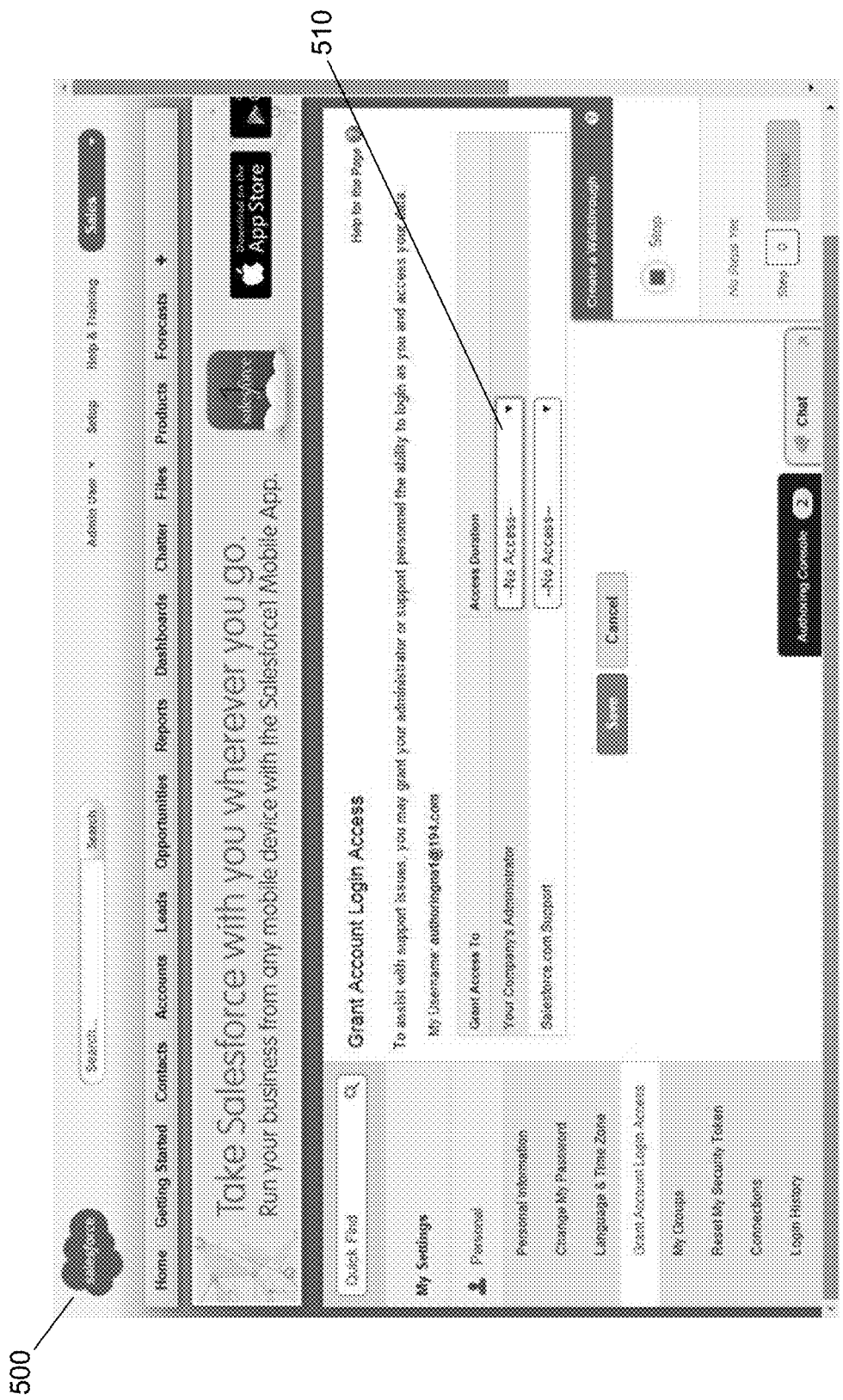
FIG. 5 shows an example of a user interface 500 for creating a walkthrough for an application, in accordance with some implementations.

FIG. 5 shows an example of a user interface 500 for creating a walkthrough for an application, in accordance with some implementations. The user creating the walkthrough may select the first dropdown menu 510 to select an access duration for a company administrator for access to the user's account login.

Figure 6:
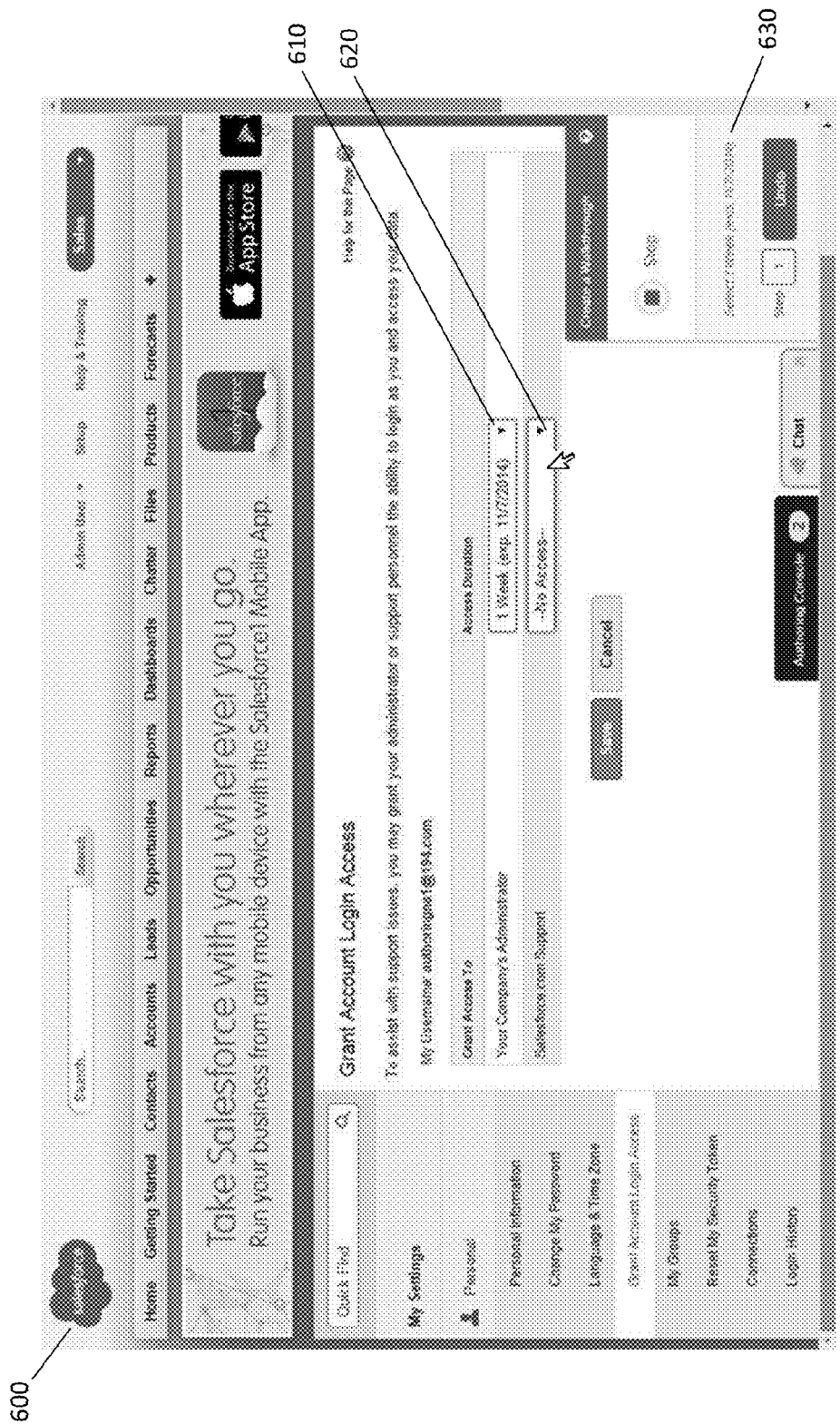
FIG. 6 shows an example of a user interface 600 for creating a walkthrough for an application, in accordance with some implementations.

In FIG. 2, at block 254, the server of the database system identifies the new unique identifier for the first user interface element. FIG. 6 shows an example of a user interface 600 for creating a walkthrough for an application, in accordance with some implementations. In FIG. 6, the user has selected the "1 Week" option from the dropdown menu 610. When the user selects this option in the dropdown menu 610, the server identifies the unique identifier for the selected option, which was generated by the server at block 230 of FIG. 2.

In FIG. 2, at block 256, the server of the database system stores the unique identifier for the user interface element in a data object of the database containing data for a first walkthrough stage for the walkthrough. The database may store data objects identifying walkthrough stages. As an example, the identifier for the "1 Week" option from dropdown menu 610 may be stored with other information pertaining to that first stage of the walkthrough executed by the user of the walkthrough authoring tool.

In some implementations, when the walkthrough is subsequently played by another user at a computing device, the data for each stage of the walkthrough, including the unique identifier for the dropdown menu 610 user interface element, is provided to the computing device to display a presentation of the walkthrough.

In some implementations, when the user submits the request to play the walkthrough, the web application for the walkthrough is displayed with the unique identifiers provided in the edited source code stored in the database. The walkthrough player may then use the unique identifiers of the user interface elements to identify and highlight the user interface elements involved in the walkthrough playback.

Returning to FIG. 6, once the user has recorded the selection "1 Week" from the first dropdown menu 610, the first stage of the walkthrough 630 may be displayed in the user interface 600. The user may then perform and record the second stage of the walkthrough.

In some implementations, the user interface elements that may be selected in the walkthrough may be the user interface elements that have unique identifiers. In these implementations, the selectable user interface elements maybe be displayed with highlighting when the user mouses over them. In FIG. 6, the second dropdown menu 620 appears highlighted when the user mouses over the menu 620.

Figure 7:
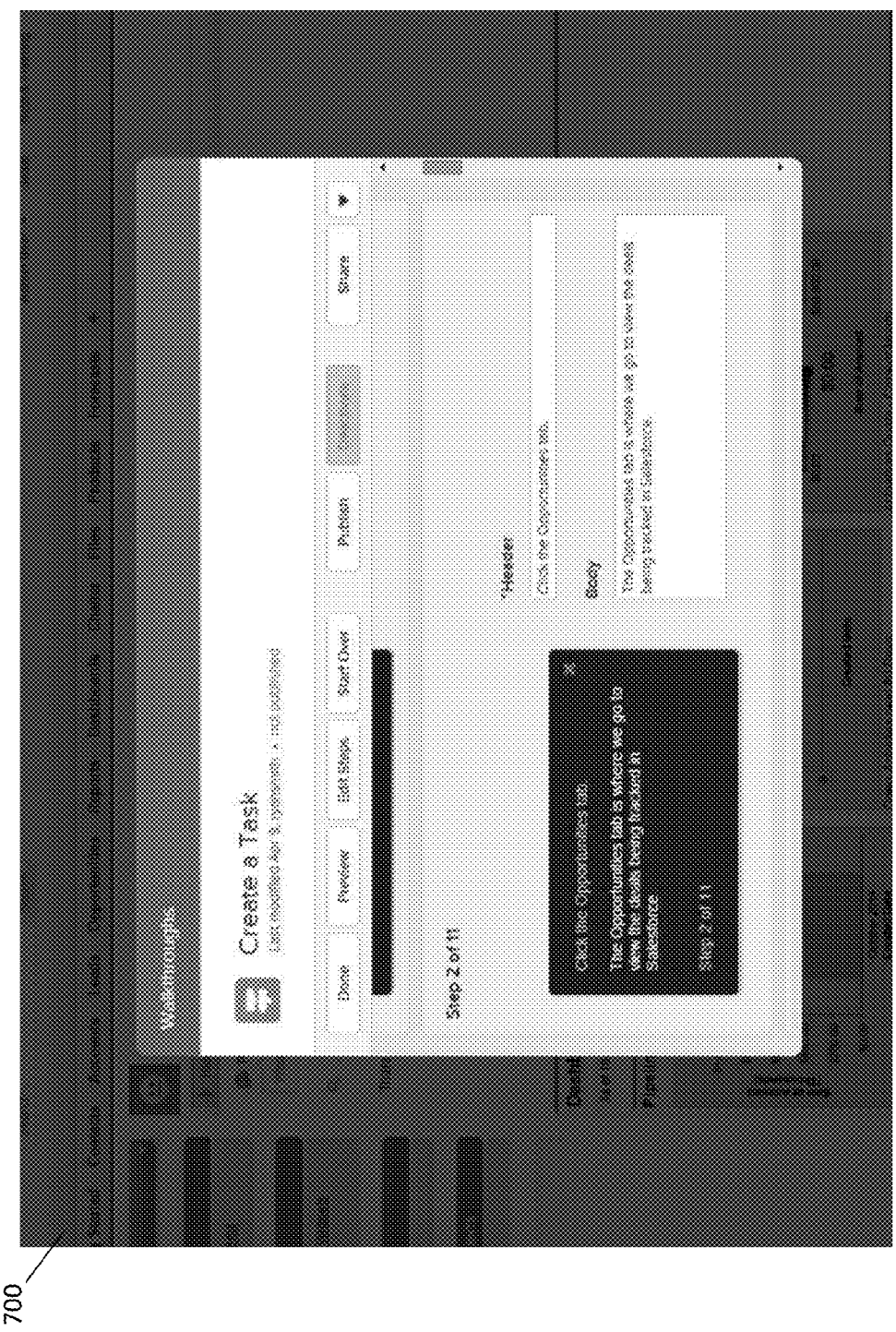
FIG. 7 shows an example of a user interface 700 for creating a walkthrough for an application, in accordance with some implementations.

FIG. 7 shows an example of a user interface 700 for creating a walkthrough for an application, in accordance with some implementations. After the user authoring the walkthrough records the steps of the walkthrough, the user may add notes and additional information for each stage of the walkthrough to be displayed to a user when the walkthrough is being played.

Figure 3:
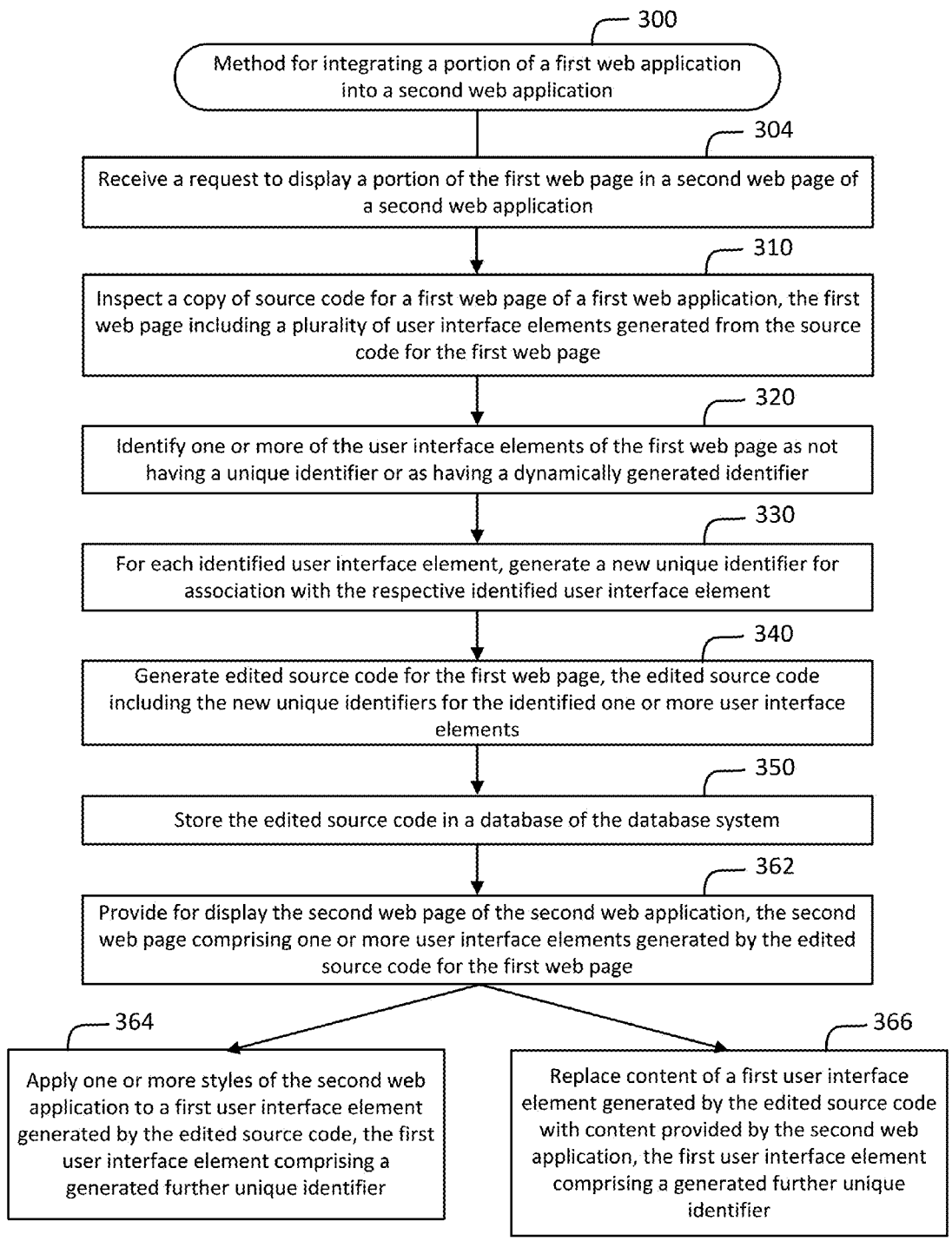
FIG. 3 shows a flowchart of an example of a method 300 for integrating a portion of a first web application into a second web application, performed in accordance with some implementations.

FIG. 3 shows a flowchart of an example of a method 300 for integrating a portion of a first web application into a second web application, performed in accordance with some implementations. In FIG. 3, at block 304, a server of a database system receives a request to display a portion of a first web page of a first web application in a second web page of a second web application.

As an example, the second web application may be a cloud-based computing application configured to display a feed for a user of a customer relationship management (CRM) database system. The CRM web application may provide for display the user's feed, as well as additional information in the sidebars of the user interface, such as information for other users, a navigation menu, and a help menu. An administrator of the CRM web application may wish to include a photo sharing user interface component in a sidebar of the user interface of the CRM web application. Instead of developing and writing new source code for the photo sharing user interface component, the administrator may wish to integrate code for an existing photo sharing user interface component from a different photo application into the second web application, with a few changes to aspects of the existing photo sharing user interface component. For example, the administrator may wish to change the styling or branding of the photo sharing component to match the styling or branding of the CRM web application in which the photo sharing component is to be integrated. In order to make the desired changes to the existing photo sharing user interface component, the administrator may need to know how to reliably identify the various elements of the photo sharing component. In blocks 310-350 of FIG. 3, described hereafter, the server of the database system may inspect the code for the existing photo sharing component and generate edited source code for the photo sharing component containing unique identifiers for each of the various elements of the photo sharing component. The photo sharing component may thus be integrated into the CRM web application, and the server hosting the CRM web application may identify and manipulate various elements of the photo sharing component.

In FIG. 3, at block 310, the server of the database system inspects a copy of source code for a web page of a web application, as generally described in block 110 of FIG. 1.

In FIG. 3, at block 320, the server of the database system identifies one or more user interface elements of the web page either as not having a unique identifier, or as having a dynamically generated identifier, as generally described in block 120 of FIG. 1.

In FIG. 3, at block 330, the server of the database system for each identified user interface element, the server of the database system generates a new unique identifier for association with the respective identified user interface element, as generally described in block 130 of FIG. 1.

In FIG. 3, at block 340, the server of the database system the server of the database system generates edited source code for the first web page, as generally described in block 140 of FIG. 1.

In FIG. 3, at block 350, the server of the database system the server of the database system stores the edited source code in a database, as generally described in block 150 of FIG. 1.

In FIG. 3, at block 362, the server of the database system provides for display the web page of the CRM web application, the web page of the CRM web application including code for the photo sharing component from the photo sharing application. The code for the photo sharing component may be different from the original source code for the photo sharing component in that the code for the photo sharing component as displayed within the CRM web application contains unique identifiers for all of the relevant user interface elements of the photo sharing component, and the user interface elements of the photo sharing component displayed in the CRM web application are generated from the edited source code generated at block 340 of FIG. 3.

In FIG. 3, at block 364, the server of the database system applies one or more styles of the CRM web application to a user interface element of the photo sharing component displayed within the CRM web application. As an example, the user interface element may be the header text of the photo sharing component. The edited code for the user interface element may include an identifier that CSS code of the CRM web application identifies, such that the CSS styles for the CRM web application are applied to the user interface element of the photo sharing component.

In FIG. 3, at block 366, the server of the database system replaces the contents of a user interface element of the photo sharing component displayed within the CRM web application. The contents of the user interface element may be replaced with new content provided by the CRM web application. The user interface element may be identified by an identifier generated by the server at block 340 of FIG. 3. As an example, the user interface element may be a branded image for the photo sharing component that matches the branding of the photo sharing application. The administrator may wish to replace the image to match the branding of the CRM web application. In this example, the image may be replaced with an image that matches the branding of the CRM web application.

Figure 8A:
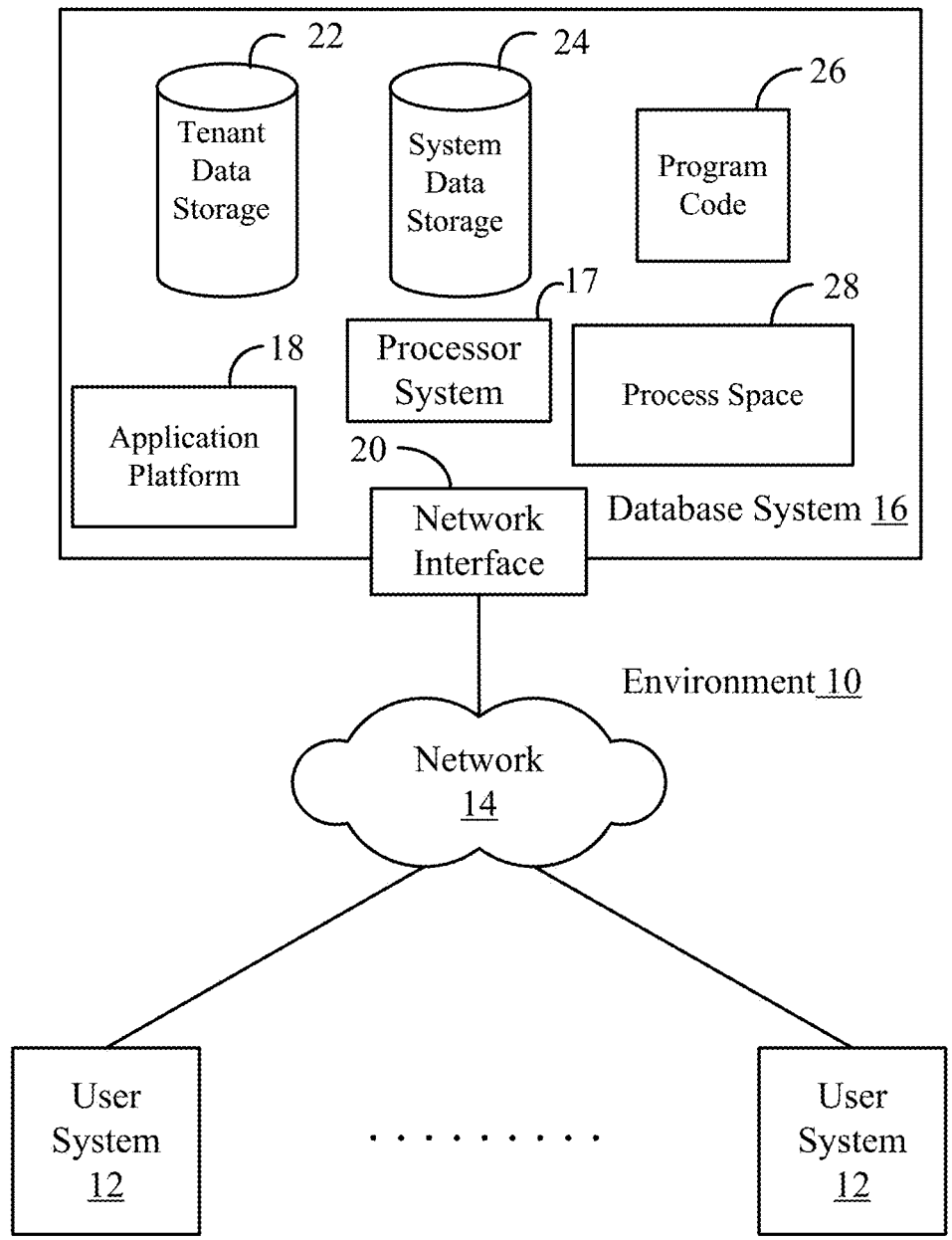
FIG. 8A shows a block diagram of an example of an environment 10 in which an on-demand database service can be used in accordance with some implementations.

Systems, apparatus, and methods are described below for implementing database systems in conjunction with the disclosed techniques. FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a number of servers. At least for users accessing system 16, each of the servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 9A:
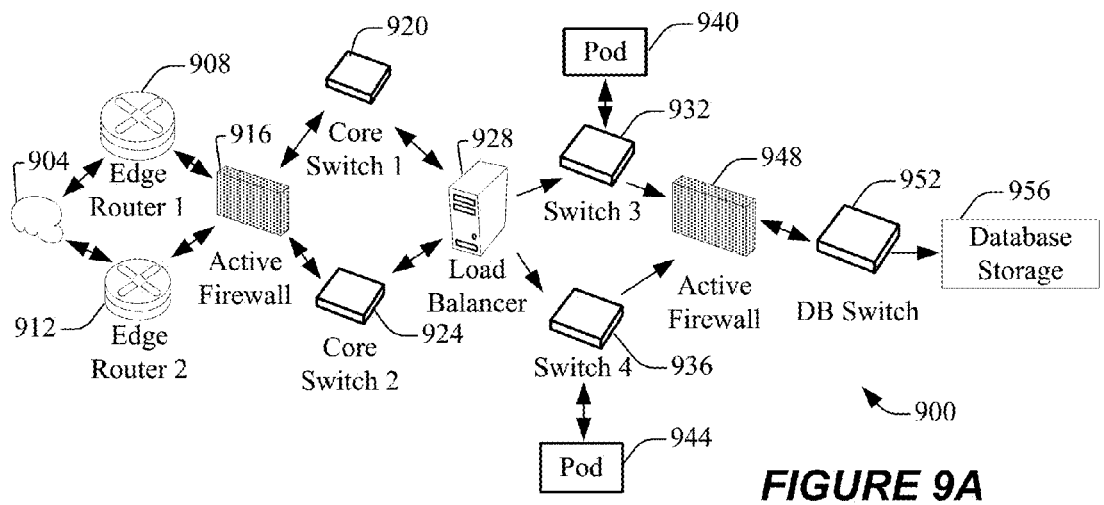
FIG. 9A shows a system diagram of an example of architectural components of an on-demand database service environment 900, in accordance with some implementations.
Figure 9B:
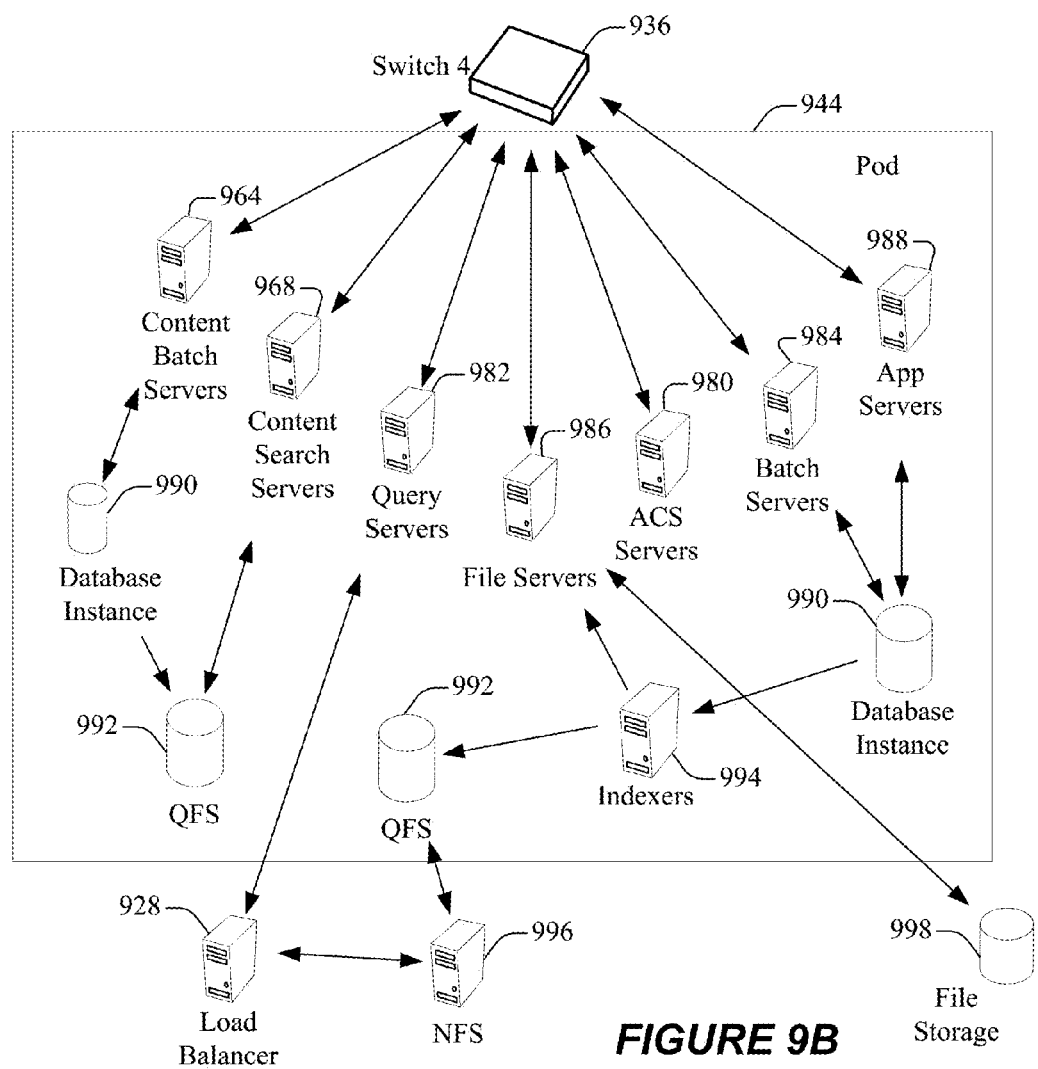
FIG. 9B shows a system diagram further illustrating an example of architectural components of an on-demand database service environment, in accordance with some implementations.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
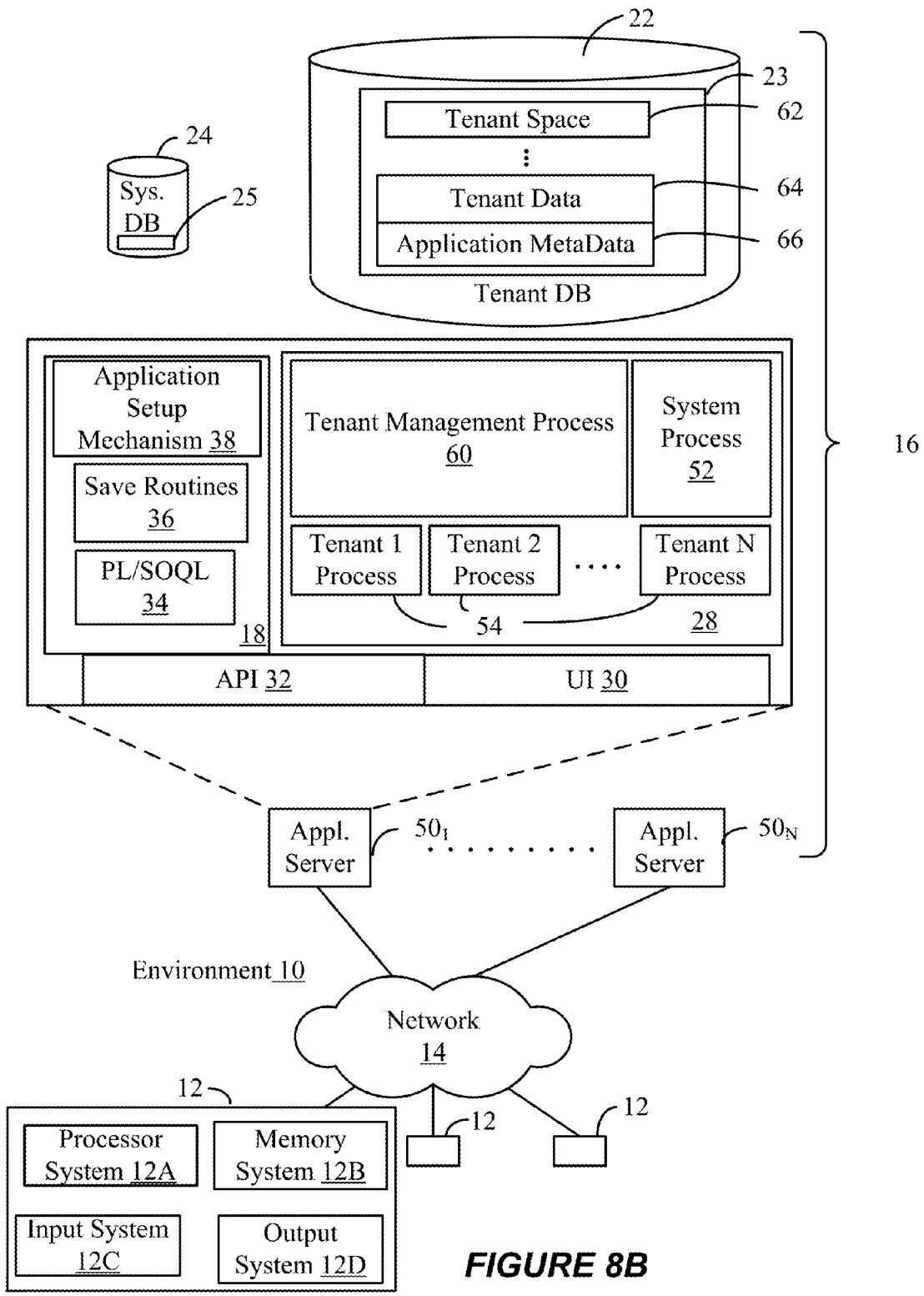
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via a firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to cause performance of services described herein, including performance of one or more of the operations of methods described herein with reference to FIGS. 1-7. In alternative implementations, two or more app servers 988 may be included to cause such methods to be performed, or one or more other servers described herein can be configured to cause part or all of the disclosed methods to be performed.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking system, also referred to herein as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, Customer Relationship Management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
analyzing, using a walkthrough authoring tool, first source code for a first web page of a first web application, the first web page comprising a plurality of user interface elements capable of being displayed at a user interface of a display device;
identifying, using the first source code, a first one of the user interface elements of the first web page as not having a static identifier or as having a dynamically generated identifier;
generating a unique identifier associated with the first user interface element;
generating second source code for the first web page, the second source code comprising the unique identifier associated with the first user interface element;
processing, using the walkthrough authoring tool, a first selection of the first user interface element;
responsive at least in part to processing the first selection, generating a first stage of a walkthrough, the first stage configurable to cause display of a second stage of the walkthrough based on a user selection of the first user interface element;
processing a request to interact with a presentation of the walkthrough;
displaying, using the second source code, the first stage of the walkthrough at the user interface of the display device; and
displaying, responsive to a user selecting the first user interface element, the second stage of the walkthrough.

2. The system of claim 1, the database system further configurable to cause:
removing one or more dynamically generated identifiers from the first source code.

3. The system of claim 1, wherein a second one of the user interface elements has a different state from a previous state each time the first web page is loaded.

4. The system of claim 2, the database system further configurable to cause:
determining one or more user interface elements to be removed from the second source code; and
removing the determined one or more user interface elements from the second source code.

5. The system of claim 4, the determined one or more user interface elements comprising advertising content.

6. The system of claim 1, the database system further configurable to cause:
generating a first hash of the first source code; and
storing the first hash in association with the second source code in a database of the database system.

7. The system of claim 6, the database system further configurable to cause:
processing a request to display further source code for the first web page of the first web application;
generating a second hash of the further source code;
determining that the second hash of the further source code matches the first hash of the first source code; and
updating the further source code to comprise the unique identifier of the second source code.

8. The system of claim 7, the database system further configurable to cause:
removing dynamically generated identifiers from the further source code for the first web page;
determining further user interface elements of the further source code to be removed from the further source code; and
removing the determined further user interface elements from the further source code.

9. The system of claim 1, wherein the first user interface element is a HyperText Markup Language (HTML) element, and the unique identifier is a class name or a class ID for the first user interface element.

10. The system of claim 1, wherein the first source code comprises a Document Object Model (DOM) for the first web page, and the second source code for the first web page comprises an edited DOM for the first web page.

11. The system of claim 1, the database system further configurable to cause:
processing a request to play the walkthrough; and
providing data to play the walkthrough, the data comprising the second source code for the first web page of the first web application.

12. The system of claim 1, the database system further configurable to cause:
  processing a request to display a portion of the first web page in a second web page of a second web application; and
  providing for display the second web page of the second web application, the second web page comprising the second source code.

13. The system of claim 12, the database system further configurable to cause:
  applying one or more styles of the second web application to the first user interface element, the first user interface element comprising the unique identifier.

14. A method comprising:
  analyzing, using a walkthrough authoring tool, a first source code for a first web page of a first web application implemented using a database system, the first web page comprising a plurality of user interface elements capable of being displayed at a user interface of a display device, the first source code stored in a database of the database system;
  identifying, using the first source code, a first one of the user interface elements of the first web page as not having a static identifier or as having a dynamically generated identifier;
  generating a unique identifier associated with the first user interface element;
  generating second source code for the first web page, the second source code comprising the unique identifier associated with the first user interface element;
  processing, using the walkthrough authoring tool, a first selection of the first user interface element;
  responsive at least in part to processing the first selection, generating a first stage of a walkthrough, the first stage configurable to cause display of a second stage of the walkthrough based on a user selection of the first user interface element;
  processing a request to interact with a presentation of the walkthrough;
  providing, using the second source code, the first stage of the walkthrough at the user interface of the display device; and
  providing, responsive to a user selecting the first user interface element, the second stage of the walkthrough.

15. The method of claim 14, the method further comprising:
  removing one or more dynamically generated identifiers from the first source code.

16. The method of claim 14, wherein a second one of the user interface elements has a different state from a previous state each time the first web page is loaded.

17. The method of claim 14, the method further comprising:
  generating a first hash of the first source code;
  storing the first hash in association with the second source code in the database of the database system
  receiving a request to display further source code for the first web page of the first web application;
  generating a second hash of the further source code;
  determining that the second hash of the further source code matches the first hash of the first source code; and
  updating the further source code to comprise the unique identifier of the second source code.

18. A computer program product comprising computer-readable program code to be executed by at least one processor when retrieved from a non-transitory computer-readable medium, the program code comprising instructions configurable to cause:
  analyzing, using a walkthrough authoring tool, a first source code for a first web page of a first web application implemented using a database system, the first web page comprising a plurality of user interface elements capable of being displayed at a user interface of a display device, the first source code stored in a database of the database system;
  identifying, using the first source code, a first one of the user interface elements of the first web page as not having a static identifier or as having a dynamically generated identifier;
  generating a unique identifier associated with the first user interface element;
  generating second source code for the first web page, the second source code comprising the unique identifier associated with the first user interface element;
  processing, using the walkthrough authoring tool, a first selection of the first user interface element;
  responsive at least in part to processing the first selection, generating a first stage of a walkthrough, the first stage configurable to cause display of a second stage of the walkthrough based on a user selection of the first user interface element;
  processing a request to interact with a presentation of the walkthrough;
  displaying, using the second source code, the first stage of the walkthrough at the user interface of the display device; and
  displaying, responsive to a user selecting the first user interface element, the second stage of the walkthrough.

19. The computer program product of claim 18, the instructions further configurable to cause:
  removing one or more dynamically generated identifiers from the first source code.

20. The computer program product of claim 18, wherein a second one of the user interface elements has a different state from a previous state each time the first web page is loaded.

* * * * *